(12) United States Patent
Sadananda et al.

(10) Patent No.: US 12,511,276 B2
(45) Date of Patent: Dec. 30, 2025

(54) GRANULAR TRACKING OF LOCKING QUERIES TO REDUCE LOCKING

(71) Applicant: Microsoft Technology Licensing, LLC, Redmond, WA (US)

(72) Inventors: Srinag Rao Sadananda, Bengaluru (IN); Rahul Mittal, Pune (IN); Gururama Jithendra Gandikota, Bellevue, WA (US); Srikanth Sampath, Bengaluru (IN); Prashanth Purnananda, Bothell, WA (US); Chaitanya Sreenivas Ravella, Snoqualmie, WA (US); Hanumantha Rao Kodavalla, Sammamish, WA (US); Adrian-Leonard Radu, Sammamish, WA (US); Peter Byrne, Charlotte Hall, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/675,761

(22) Filed: May 28, 2024

(65) Prior Publication Data

US 2025/0370983 A1 Dec. 4, 2025

(51) Int. Cl.
*G06F 16/00* (2019.01)
*G06F 16/23* (2019.01)

(52) U.S. Cl.
CPC .................. *G06F 16/2343* (2019.01)

(58) Field of Classification Search
CPC .................................................. G06F 16/2343
See application file for complete search history.

(56) References Cited

U.S. PATENT DOCUMENTS

| | | | |
|---|---|---|---|
| 6,606,626 B1* | 8/2003 | Ponnekanti | G06F 16/2343 709/203 |
| 11,755,558 B2 | 9/2023 | Ravella | |
| 2004/0199512 A1* | 10/2004 | Cornwell | G06F 16/2343 707/999.009 |
| 2016/0042023 A1* | 2/2016 | Leach | G06F 9/466 707/703 |
| 2024/0126745 A1* | 4/2024 | Krishnaswamy | G06F 16/2379 |
| 2025/0044940 A1* | 2/2025 | Zinger | G06F 3/0679 |

\* cited by examiner

*Primary Examiner* — Syed H Hasan
(74) *Attorney, Agent, or Firm* — Weaver IP L.L.C.

(57) ABSTRACT

Systems, methods, apparatuses, and program products are disclosed for granular tracking of locking queries. Upon receiving a data manipulation command associated with a row of a page, a flag associated with the page is checked to determine whether a row locking query (RLQ) may be associated with the page. If no RLQ is associated with the page, the data manipulation command is executed without acquiring a lock. If an RLQ may be associated with the page, it is determined whether an active lock is associated with the page. If no active lock is associated with the page, the flag is updated to indicate that no RLQ is associated with the page and the data manipulation command is executed without acquiring a lock. If an active lock is associated with the page, page-level and row-level locks are acquired on the page and the row, respectively, before executing the data manipulation command.

20 Claims, 8 Drawing Sheets

900

902 — Acquire at least one of a shared latch or an exclusive latch on an in-memory container associated with a first page 904 — Responsive to acquiring at least one of the shared latch or the exclusive latch, update a flag in the in-memory container associated with the first page to a first value indicating the possible presence of a row-locking query interested in the cached page

912 — Acquire an exclusive latch on an in-memory container associated with a first page 914 — Responsive to acquiring the exclusive latch, read a flag from the in-memory container associated with the first page

922 — Acquire an exclusive latch on an in-memory container associated with a first page 924 — Responsive to acquiring the exclusive latch, update a flag in the in-memory container associated with the first page to a second value indicating the absence of any row-locking query interested in the cached page

FIG. 9C

GRANULAR TRACKING OF LOCKING QUERIES TO REDUCE LOCKING

BACKGROUND

A database management system (DBMS) is a software/hardware system that enables users to define, create, maintain, and control access to a database (an organized collection of data). Database locks are mechanisms for controlling access to data within a DBMS to ensure data integrity and consistency in concurrent environments where multiple transactions may concurrently read and/or write the same data. Database locks can be applied at various levels, such as, but not limited to, at the table, page, row, and/or column levels, and can be broadly categorized as either shared or exclusive. Shared locks allow multiple transactions to read a resource simultaneously but prevent any transaction from modifying the resource until all shared locks are released. Conversely, exclusive locks prohibit any other transaction from accessing the resource until the lock holder completes its operation, ensuring data integrity during updates and/or deletions. Locks help ensure data integrity and consistency though can cause contention and/or performance degradation to be experienced in high-concurrency scenarios where multiple transactions are likely to concurrently read and/or write the same data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for granular tracking of locking queries to reduce locking. In response to receiving a data manipulation command associated with a first row of a first page, a database management system (DBMS) determines whether a flag associated with the first page indicates that a row locking query (RLQ) may be associated with the first page. If the flag indicates that no RLQ is associated with the first page, the DBMS executes the data manipulation command without acquiring a lock. If an RLQ may be associated with the first page, the DBMS determines whether there is an active lock associated with the first page. If there is no active lock associated with the first page, the DBMS updates the flag to indicate that no RLQ is associated with the first page. If there is an active lock associated with the first page, the DBMS acquires a lock on the first row of the first page. Thereafter, the DBMS executes the data manipulation command against the first row of the first page.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 9A depicts a flowchart of a process for updating a flag for tracking row locking queries to a first value, in accordance with an embodiment.

FIG. 9B depicts a flowchart of a process for reading a flag for tracking row locking queries, in accordance with an embodiment.

FIG. 9C depicts a flowchart of a process for updating a flag for tracking row locking queries to a second value, in accordance with an embodiment.

Figure 1:
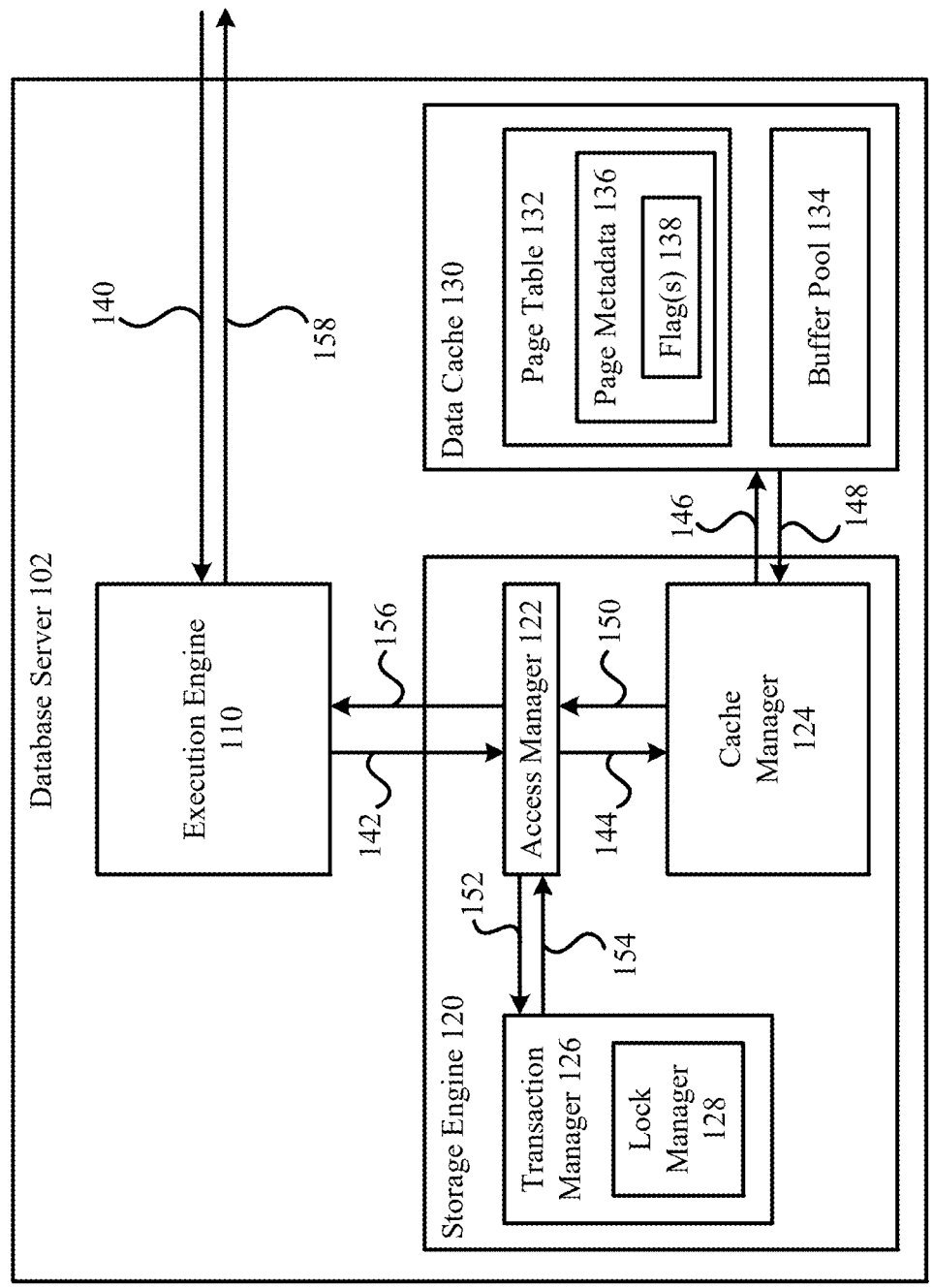
FIG. 1 shows a block diagram of an example system for granular tracking of locking queries to reduce locking, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Database locks help ensure data integrity and consistency in concurrent environments where multiple transactions may access and/or modify the same data simultaneously. Without locking mechanisms, concurrent transactions accessing and/or modifying the same data simultaneously could lead to various problems, such as, but not limited to, the lost update problem, where one transaction overwrites changes made by another transaction before the changes are committed, and/or the uncommitted dependency problem, where one transaction reads data that is in the process of being modified by another transaction, resulting in inconsistent and/or incorrect results. Database locks help prevent these issues by temporarily restricting access to data resources to ensure that only one transaction can modify a data resource at a time, while other transactions are either granted access for reading or are temporarily blocked from accessing the data resource.

Examples of database locks include, but are not limited to shared locks, exclusive locks, and intention locks. Shared locks allow multiple transactions to read data simultaneously while preventing any transaction from modifying it. Exclusive locks restrict access to a resource to only one transaction at a time, ensuring that no other transactions can read or modify the data until the lock is released. Intention locks are used to indicate a transaction's intent to acquire locks at a finer granularity, such as a page or row, helping detect conflicts across all granularity levels of locking. These various types of locks work together to maintain data consistency and enable effective concurrency control in database systems.

Traditionally, a transaction acquired and held a database lock until the end of the transaction. For instance, a transaction that modifies data would first acquire one or more locks at different levels of granularity (e.g., database-level, table-level, page-level and/or row-level locks) for rows modified by the transaction. After the transaction acquires the necessary database locks, the transaction performs operations to read and/or modify the data. After the transaction performs the operations, the transaction releases the database locks. While simple to implement, this approach can result in a transaction holding a large number of low-level (e.g., page-level and/or row-level) locks longer than is necessary, which can lead to contention and/or performance degradation in high-concurrency scenarios where multiple transactions are likely to concurrently read and/or write the same data.

In embodiments, transactions can release locks prior to the end of the transaction by using a transaction identifier (TID) lock. A TID lock is a type of database lock used to control access to individual data records (e.g., a row) within a database table. When a transaction modifies a record (e.g., row), it acquires the necessary locks (e.g., page-level and/or row-level locks), modifies the row, and marks the row with a lock identifier unique to the transaction (e.g., transaction ID or TID). After marking the row with the TID, the transaction can release the locks (e.g., page-level and/or row-level locks), and continue to modify the marked row without acquiring another lock on the marked row. The use of TID locks reduce the duration the locks are held, resulting in improved performance in high-concurrency scenarios. With TID locks, transactions that modify a record (e.g., row) are required to mark the row with their TID. As such, transactions attempting to access the marked row to perform a read and/or write can determine whether a record (e.g., row) has been modified by an active transaction without testing for the presence of locks (e.g., page-level and/or row-level locks) on the marked row by determining whether the marked row is marked with a TID belonging to an active transaction. However, transactions that do not modify a record (e.g., row) cannot mark the row with a TID to protect the row. As such, transactions attempting to access a record (e.g., row) to perform a write still need to test the row for the presence of locks (e.g., page-level and/or row-level locks) on the row to avoid modifying a row locked by transactions reading the row.

Certain queries to read records (e.g., rows) need to protect the rows from modification for extended periods of time, and acquire locks (e.g., page-level and/or row-level locks) to protect the rows. Such queries are referred to herein as row locking queries (RLQs). Examples of RLQs include, but are not limited to, queries running at higher isolation levels like "Repeatable Read" and "Serializable," and queries that use strong lock hints. Embodiments disclosed herein are directed to the use of page-level flags to track RLQs to reduce the need to test for and/or obtain locks.

In embodiments, a DBMS maintains noRLQ flags for pages accessed to track the presence of RLQs interested in the accessed pages. For instance, a DBMS maintains noRLQ flags as metadata in a data cache in association with corresponding pages cached in the data cache. When a page is accessed, the DBMS, in embodiments, caches the accessed page in a buffer pool of a data cache, and initializes, in metadata associated with the cached page, a noRLQ flag to a first value (e.g., FALSE, 0, etc.) to indicate the possible presence of an RLQ interested in a row of the cached page. In embodiments, the noRLQ flag is implemented as a single bit where a first value of "FALSE" or "0" indicates the possible presence of an RLQ interested in the page, and where a second value of "TRUE" or "1" indicates the absence of any RLQ interested in the page, and/or vice versa. In embodiments, the noRLQ flag is implemented in other ways, such as, but not limited to, as a bit field or flag, where one or more bits in the bit field or flag indicates the possible presence and/or absence of an RLQ interested in a page, as a non-binary variable or field where one or more values of the variable or field indicates the possible presence and/or absence of an RLQ interested in a page, and/or the like. In embodiments, noRLQ flags are maintained by the DBMS while associated page is cached in the data cache, and can be deleted when the associated page is evicted from the data cache.

In embodiments, a DBMS uses page latches to control access to the in-memory containers associated with cached pages in the data cache. Latches prevent concurrent transactions from incorrectly accessing and/or modifying the same cached page and/or noRLQ flag simultaneously, thereby ensuring data consistency and/or integrity of the cached pages and noRLQ flags. In embodiments, when a transaction needs to read the value of a noRLQ flag associated with a cached page, the transaction first acquires an exclusive page latch on the in-memory container associated with the cached page to ensure that the value of the noRLQ flag does not change during execution of a data manipulation command on a given row on that cached page. In embodiments, exclusive page latches are held until execution of the data manipulation command on a given row on the cached page completes. For instance, when a transaction determines that the noRLQ flag associated with a cached page is a second value (e.g., TRUE, 1, etc.) indicating the absence of any RLQ interested in the cached page, the transaction may execute a data manipulation command on a row of the cached page without acquiring a lock because the exclusive latch held by the transaction prevents other transactions from accessing and/or locking the cached page. In embodiments, when a transaction determines that the noRLQ flag associated with a cached page is a first value (e.g., FALSE, 0, etc.) indicating the possible presence of an RLQ interested in the cached page, the transaction attempts to execute a data manipulation command on a row of the cached page without acquiring a lock. For instance, the transaction first determines whether any locks exist on the cached page, and upon determining that no locks exist on the cached page, the transaction updates the noRLQ flag associated with a cached page to the second value indicating the absence of any RLQ interested in the cached page. In embodiments the transaction may then execute the data manipulation command on a row of the cached page without acquiring a lock because the exclusive latch held by the transaction prevents other transactions from accessing and/or locking the cached page. However, because multiple transactions are permitted to simultaneously update the value of a noRLQ flag to the first value to indicate the possible presence of an RLQ interested in a row of the cached page, a transaction may obtain a shared page latch and/or an exclusive page latch on the in-memory container associated with the cached page when updating the value of a noRLQ flag associated with a cached page to the first value.

In embodiments, a data manipulating language (DML) command that needs to modify a row of a page, the DML command reads the noRLQ flag to determine whether it needs to acquire locks (e.g., page-level and/or row-level locks) prior to modifying the row. For instance, when a noRLQ flag associated with the page has a second value (e.g., TRUE, 1, etc.) indicating the absence of any RLQ interested in the page, the DML command modifies the row without acquiring locks (e.g., page-level and/or row-level locks) on the row. In embodiments, the modification of the row by the DML command includes marking the row with a TID associated with the DML command.

When the noRLQ flag associated with the page has a first value (e.g., FALSE, 0, etc.) indicating the possible presence of an RLQ interested in the page, the DML command performs additional checks prior to modifying the row. In embodiments, the DML command determines whether an RLQ is currently interested in the page by providing, to a lock manager, a request for a page-level lock (e.g., exclusive intent lock, shared exclusive intent lock, etc.) and a request to check whether any page-level locks exist on the page. If the lock manager determines that there are no page-level locks associated with the page, the lock manager, in embodiments, declines to grant the requested page-level lock and, instead, indicates that no page-level locks are associated with the page. In embodiments, the absence of page-level locks associated with the page also indicates the absence of any RLQ interested in the page. As such, responsive to an indication that no page-level locks are associated with the page, the DML command, in embodiments, updates the value of the noRLQ flag to the second value (e.g., TRUE, 1, etc.) to indicate the absence of any RLQ interested in the page, and modifying the row without acquiring locks (e.g., page-level and/or row-level locks) on the row. In embodiments, when the lock manager determines that page-level locks exist for the page, the lock manager can grant or waitlist the requested page-level lock (e.g., exclusive intent lock, shared exclusive intent lock, etc.) based on a compatibility of the existing page-level locks and the requested page-level lock. When the DML command is granted the requested page-level lock, the DML command can proceed with acquisition of a row-level lock, followed by modification of the row and marking of the row with a TID associated with the DML command.

In embodiments, noRLQ flags are also updated by RLQs interested in reading one or more rows of a page. For instance, when an RLQ is interested in reading a row of a page, the RLQ acquires locks (e.g., page-level and/or row-level locks) to protect the row and/or page from modification by other transactions, and updates the noRLQ flag associated with the page to a first value (e.g., FALSE, 0, etc.) to indicate the possible presence of an RLQ interested in a row of the cached page. After the RLQ is no longer interested in the row of the page, the RLQ, in embodiments, releases the locks (e.g., page-level and/or row-level locks). In embodiments, the RLQ does not update the noRLQ flag to indicate that they are no longer interested in the row. Instead, in embodiments, the task of updating the flag is borne by a DML command that is interested in modifying the row. As discussed above, when a DML command encounters a noRLQ flag with the first value (e.g., FALSE, 0, etc.) indicating the possible presence of an RLQ interested in the page, the DML command determines whether any RLQ is currently interested in the page by requesting, from a lock manager, a page-level lock (e.g., exclusive intent lock). Responsive to determining that no page-level locks are associated with the page, the DML command, in embodiments, updates the value of the noRLQ flag to the second value (e.g., TRUE, 1, etc.) to indicate the absence of any RLQ interested in the page.

These and further embodiments are disclosed herein that enable the functionality described above and additional functionality. Such embodiments are described in further detail as follows.

For example, FIG. 1 shows a block diagram of an example system 100 for granular tracking of locking queries to reduce locking, in accordance with an embodiment. As shown in FIG. 1, system 100 includes a database server 102 that comprises an execution engine 110, a storage engine 120, and a data cache 130. Storage engine 120 further comprises an access manager 122, a cache manager 124, and a transaction manager 126, and data cache 130 further comprises a page table 132 and a buffer pool 134. Furthermore, transaction manager 126 further comprises a lock manager 128. Additionally, page table 132 further includes page metadata 136, which includes one or more flags 138. System 100 is described in further detail as follows.

Database server 102 comprises a physical and/or logical computer system configured to store, manage, and/or retrieve data stored on one or more data repositories. In embodiments, database server 102 runs DBMS software to perform tasks attributed to database server 102 and/or components thereof. Various example implementations of database server 102 are described below in reference to FIG. 9 (e.g., network-based server infrastructure 970, on-premises servers 992, and/or components thereof).

Execution engine 110 is configured to interpret and/or execute queries and/or commands issued by users and/or applications. For instance, execution engine 110 receives queries 140, such as, high-level queries written in SQL or other query languages, into low-level instructions. In embodiments, execution engine 110 optimizes query processing for efficiency, by employing techniques such as, but not limited to, query parsing, query optimization, and/or query execution plan generation to minimize resource usage and/or maximize performance. In embodiments, execution engine 110 provides commands 142 to storage engine 120 to retrieve data (e.g., rows) 156, and generates query results 158 by executing queries 140 and/or an optimized queries derived therefrom, based on retrieved data 156. In embodiments, execution engine 110 performs various tasks to coordinate data retrieval, data manipulation, and/or storage operations, such as, but not limited to, concurrency control, transaction management, and/or the like.

Storage engine 120 is configured to manage the storage of data on disk or in memory. In embodiments, storage engine 120 retrieves data from disk for caching in data cache 130, and/or stores data cached in data cache 130 to disk. As shown in FIG. 1, storage engine 120 comprises access manager 122, cache manager, 124, and transaction manager 126.

Access manager 122 is configured to manage how data within a database is accessed. In embodiments, access manager 122 monitors the access of pages to determine whether query performance can be improved by, for example, but not limited to, adding or modifying indexes, adding or moving partitions, adding files or file groups, defragmenting indexes, and/or by rewriting queries. In embodiments, access manager 122 provides requests 144 to cache manager 124 to retrieve page 150.

Cache manager 124 is configured to transfer data between disk storage and an in-memory data cache (e.g., data cache 130, buffer pool 134, etc.). In embodiments, cache manager 124 maintains buffer pool 134 to cache frequently accessed data pages from the disk. For instance, when queries 140 and/or commands 142 require a page, cache manager 124 checks buffer pool 134 for the required page. If the required page is present, cache manager 124, in embodiments, issues an instruction 146 to fetch a cached page 148 from buffer pool 134, and returns cached page 148 to access manager 122 as page 150. If the page is not in memory, cache manager 124, in embodiments, retrieves a missing page from disk and caches it in buffer pool 134 for future access. In embodiments, buffer manager 134 manages pages cached in buffer pool 134 using various cache replacement algorithms, such as, but not limited to, least recently used (LRU), least frequently used (LFU), most recently used (MRU), first-in-first-out (FIFO), random replacement, and/or the like.

Transaction manager 126 is configured to coordinate the execution of database transactions, which are sequences of operations that succeed or fail as a single unit. As shown in FIG. 1, transaction manager 126 comprises lock manager 128. In embodiments, transaction manager 126 enforces ACID (Atomicity, Consistency, Isolation, Durability) properties by managing concurrency control mechanisms to prevent interference between concurrently executing transactions.

Lock manager 128 is configured to regulate access to data resources by controlling the acquisition, release, and coordination of locks on database records (e.g., rows, pages, tables, and/or entire databases). For instance, lock manager 128 ensures that concurrently executing transactions operate in a consistent and isolated manner by preventing conflicting or concurrent access that could lead to data inconsistency or corruption. In embodiments, lock manager 128 receives lock requests 152, determines whether lock requests 152 should be granted, and returns, as lock responses 154, grants and/or waitlists of the requested locks. In embodiments, lock manager 128 can decline to process a lock request 152 for a page-level lock (e.g., exclusive intent lock) on a page by indicating, via a lock response 154 that no page-level locks are associated with the page. In embodiments, lock manager 128 employs various types of lock, such as, but not limited to, shared locks, exclusive locks, intent locks, and/or the like, at varying levels of granularity (e.g., database-level, table-level, page-level, and/or row-level locks) to improve performance in high-concurrency environments.

Data cache 130 is configured to store frequently and/or recently accessed pages in memory to optimize query performance and reduce latency. As shown in FIG. 1, data cache 130 comprises page table 132 and buffer pool 134. In embodiments, buffer pool 134 comprises a region of memory (e.g., RAM) that is organized into an array of fixed-size pages, the entries in the array referred to as frames. When a page not residing in buffer pool 134 is accessed, in embodiments, an exact copy of the page is retrieved from disk and placed into a frame of buffer pool 134, and an entry is added to page table 132 to track the placement of the page in buffer pool 134.

In embodiments, to enable efficient use of buffer pool 134, page table 132 is configured to store page metadata 136. For instance, page table 132 includes an in-memory mapping of page identifiers stored in buffer pool 134 to the frame location where the page is stored in buffer pool 134. In embodiments, page table 132 includes additional page metadata 136, such as, but not limited to, a pin/reference counter to track the number of threads currently accessing a cached page, and flag(s) 138. In embodiments, flag(s) 138 include a dirty-page flag to track whether a cached page has been modified and needs to be written-back to disk, and a noRLQ flag to track whether a RLQ is interested in the cached page. In embodiments, information stored in page table 132, such as, but not limited to, page metadata 136, flag(s) 138, and/or components thereof, are persisted in memory while a page associated with the information is cached in buffer pool 134, and can be erased or deleted when the page associated with the information is evicted from buffer pool 134.

Figure 2:
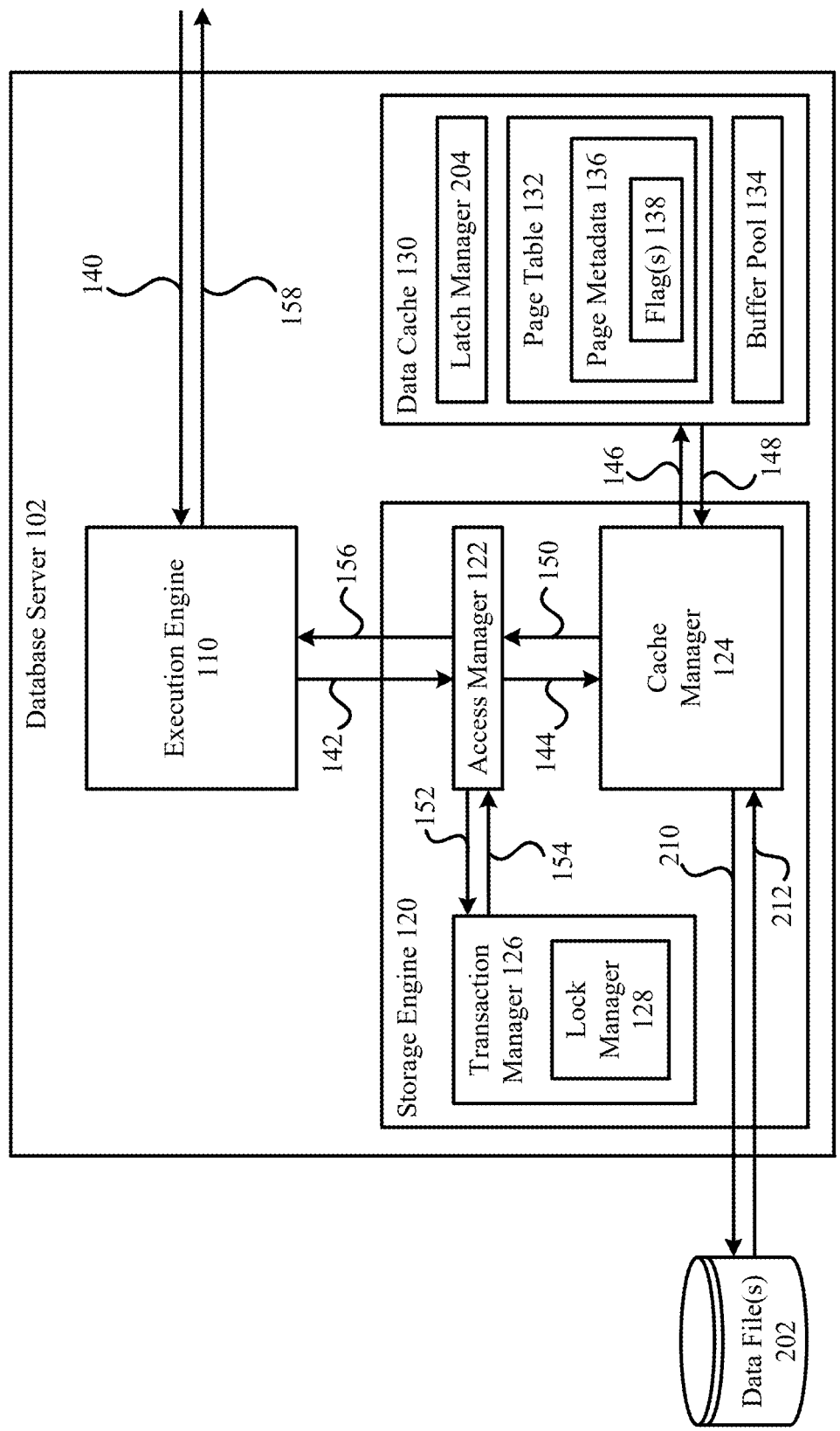
FIG. 2 shows a block diagram of an example system for granular tracking of locking queries to reduce locking, in accordance with an embodiment.

Embodiments described herein may operate in various ways to perform granular tracking of locking queries to reduce locking. For instance, FIG. 2 shows a block diagram of an example system 200 for granular tracking of locking queries to reduce locking, in accordance with an embodiment. As shown in FIG. 2, system 200 comprises database server 102, execution engine 110, storage engine 120, access manager 122, cache manager 124, transaction manager 126, lock manager 128, data cache 130, page table 132, buffer pool 134, page metadata 136, and flag(s) 138. Additionally, system 200 further comprises one or more data files 202, and data cache 130 further comprises a latch manager 204. System 200 is described in further detail as follows.

Data file(s) 202 comprise data of a database stored on disk. In embodiments, data file(s) 202 comprise files storing one or more fixed-size pages that comprise a header and one or more rows of the database. Storage engine 120, in embodiments, issues requests 210 to retrieve pages 212 stored in data file(s) 202 as needed and caches retrieved pages 212 in data cache 130.

Latch manager 204 is configured to control access to components of data cache 130, including page table 132, buffer pool 134, and/or components thereof. In embodiments, latch manager 204 coordinates the acquisition and release of latches, which are lightweight synchronization mechanisms used to protect access to structures of data cache 130, such but not limited to, page table 132, buffer pool 134, page metadata 136, flag(s) 138, and/or components thereof. By preventing concurrent access to critical memory areas, latch manager 204 ensures data integrity and consistency within the structures of data cache 130.

Figure 3A:
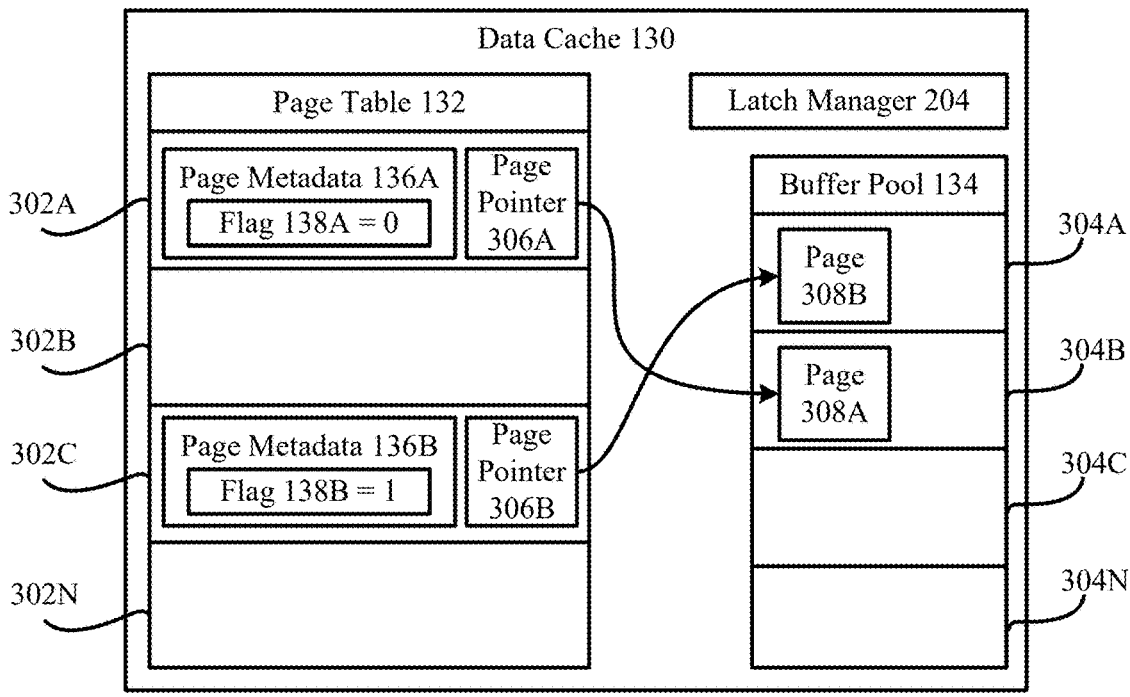
FIG. 3A shows a block diagram of an example system for reading a flag for tracking row locking queries, in accordance with an embodiment.
Figure 3B:
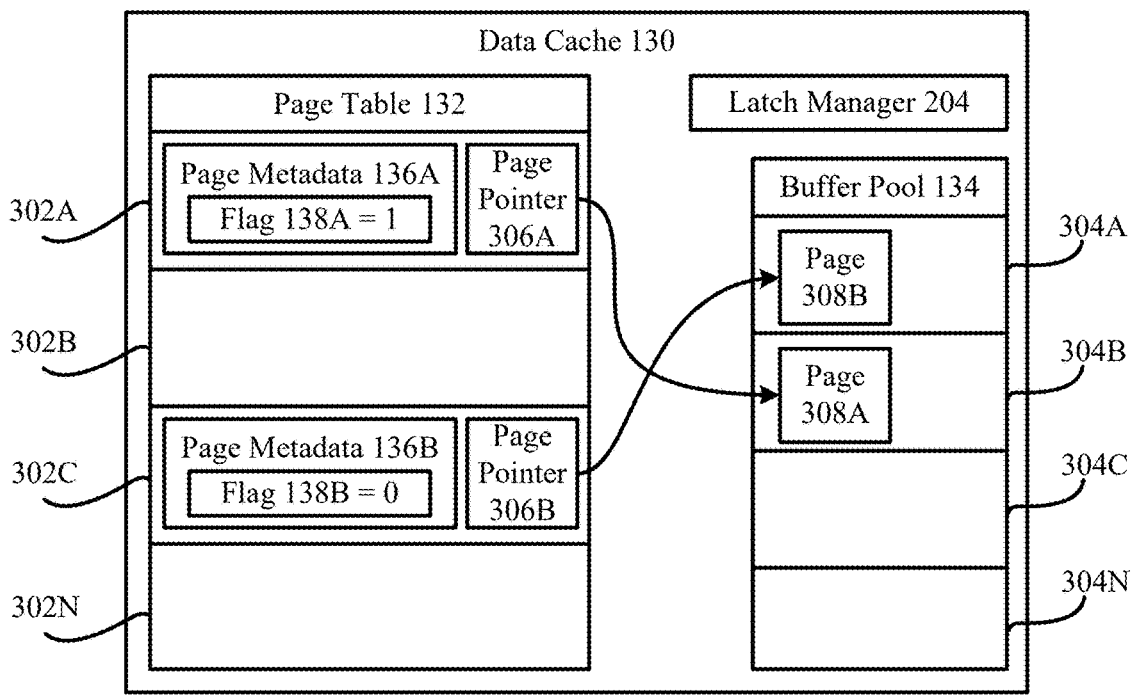
FIG. 3B shows a block diagram of an example system for updating a flag for tracking row locking queries, in accordance with an embodiment.

Embodiments described herein may operate in various ways to read and/or update a flag for tracking row locking queries. FIG. 3A shows a block diagram of an example system 300A for reading a flag for tracking row locking queries, in accordance with an embodiment, and FIG. 3B shows a block diagram of an example system for updating a flag for tracking row locking queries, in accordance with an embodiment. As shown in FIGS. 3A-3B, systems 300A and/or 300B comprise data cache 130, page table 132, buffer pool 134, page metadata 136A-136B, flag(s) 138A-138B, and latch manager 204. Additionally, page table 132 further comprises one or more page table entries 302A-302N, and buffer pool 134 further comprises one or more frames 304A-304N. In embodiments, page table entries 302A-302N further comprise one or more page pointers 306A-306B. System(s) 300A-300B are described in further detail as follows.

Page table entries 302A-302N comprise entries of page table 132 that are configured to store page metadata 136 (e.g., page metadata 136A-136B), and page pointer(s) 306 (e.g., 306A-306B) that reference pages 308 (e.g., pages 308A-308B) cached in frame(s) 304A-304N of buffer pool 134. In embodiments, page table entries 302A-302N comprise a page mapping between page identifiers of the page(s) 308A-308B stored in page metadata 136A-136B and page pointer(s) 306A-306B that reference the frame(s) 304A-304N of buffer pool 134 where page(s) 308A-308B are cached.

Figure 4:
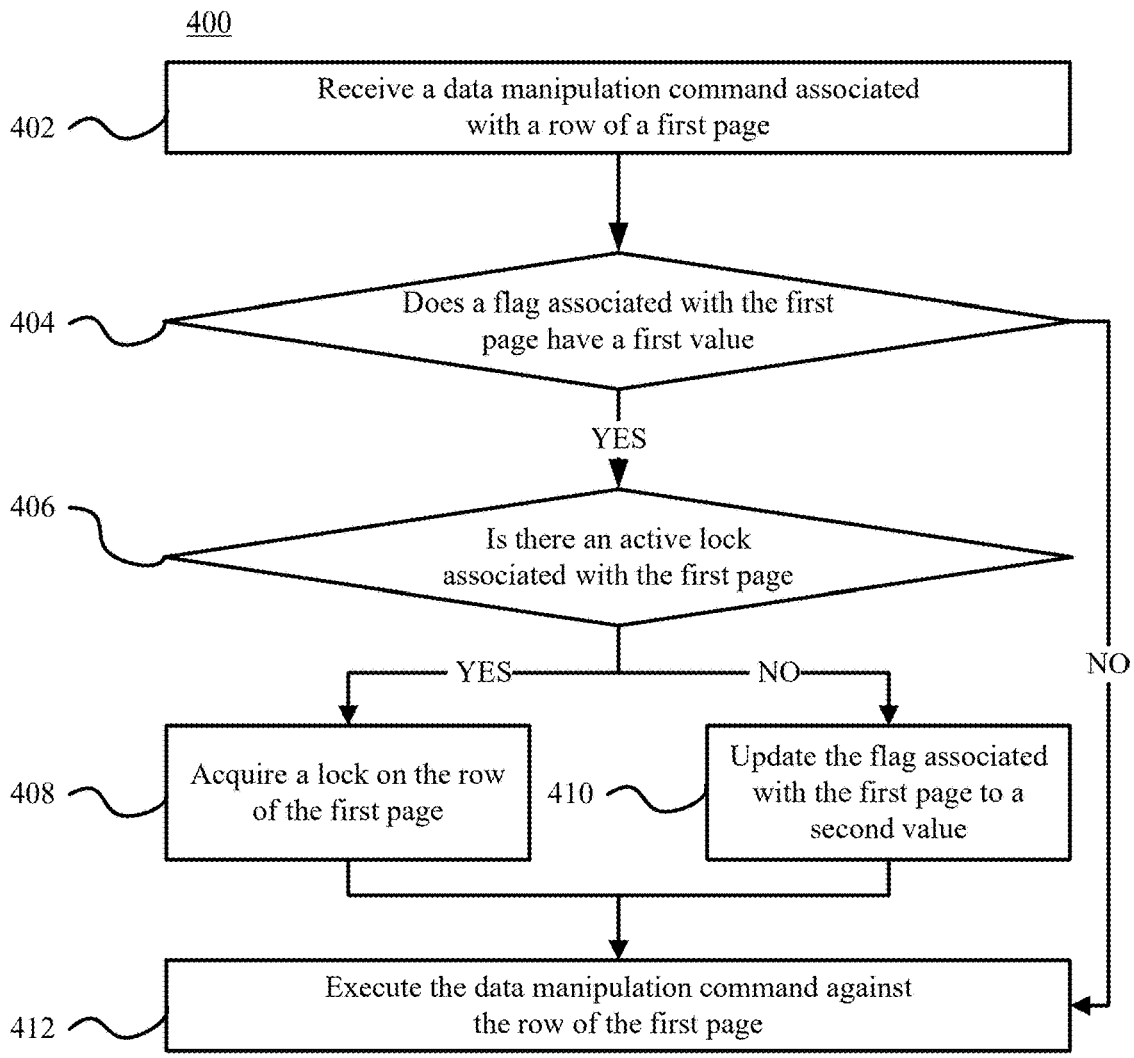
FIG. 4 depicts a flowchart of a process for granular tracking of locking queries to reduce locking, in accordance with an embodiment.

Embodiments described herein may operate in various ways to perform granular tracking of locking queries to reduce locking. FIG. 4 depicts a flowchart 400 of a process for granular tracking of locking queries to reduce locking, in accordance with an embodiment. Database server 102, execution engine 110, storage engine 120, access manager 122, cache manager 124, transaction manager 126, lock manager 128, data cache 130, page table 132, buffer pool 134, page metadata 136, flag(s) 138, data file(s) 202, and/or latch manager 204 may, for example, operate according to flowchart 400. Note that not all steps of flowchart 400 may need to be performed in all embodiments, and in some embodiments, the steps of flowchart 400 may be performed in different orders than shown. Flowchart 400 is described as follows with respect to FIGS. 1-3B for illustrative purposes.

Flowchart 400 starts at step 402. In step 402, a data manipulation command associated with a first row of a first page is received. For example, storage engine 120 receives, from execution engine 110, a DML command 142 to modify page 308A cached in buffer pool 134. In embodiments, page 308A is cached in buffer pool 134 prior to arrival of DML command 142, or cached in buffer pool 134 responsive to DML command 142. In embodiments, DML commands are used to interact with and modify data within a database, and include, for example, SQL (Structured Query Language) commands, such as, but not limited to, INSERT, UPDATE, DELETE, and/or SELECT.

In step 404, it is determined whether a flag associated with the first page is determined to have a first value. For example, storage engine 120 tests a noRLQ flag (e.g., flag 138A in page table entry 302A of system 300A) to determine whether the noRLQ flag associated with page 308A is equal to a first value (e.g., FALSE, 0, etc.) indicating the possible presence of an RLQ interested in page 308A and/or a row thereof. In embodiments, storage engine 120 interacts with latch manager 204 to acquire an exclusive latch on the in-memory container (e.g., page table entry 302A) storing the noRLQ flag associated with page 308A prior to testing the noRLQ flag associated with page 308A. In embodiments, the acquired exclusive latch is held until it is no longer needed (e.g., after completion of step 412). If the flag associated with the first page is determined to have the first value, flowchart 404 proceeds to step 406, otherwise, flowchart 400 proceeds to step 412.

In step 406, responsive to determining that the flag associated with the first page is the first value, it is determined whether there is an active lock associated with the first page. For example, access manager 122 issues a lock request 152 for a lock on page 308A, along with a request to check whether any page-level locks exist on page 308A. In embodiments, if lock manager 128 determines that there are no page-level locks associated with page 308A, lock manager 128 declines to grant the requested page-level lock and, instead, indicates, via a lock response 154 that no page-level locks are associated with page 308A. If an active lock is determined to be associated with the first page, flowchart 400 proceeds to step 408, otherwise flowchart 400 proceeds to step 410.

In step 408, a lock is acquired on the row of the first page. For example, a request is provided to lock manager 128 for a page-level lock on the first page. In embodiments, lock manager 128 determines whether a page-level lock is associated with the first page, and can grant or waitlist the requested page-level lock (e.g., exclusive intent lock, shared exclusive intent lock, etc.) based on a compatibility of any existing page-level locks and the requested page-level lock. In embodiments, responsive to the page-level lock being granted, a request is made to lock manager 128 for an appropriate row-level lock on the row of the first page. In embodiments, lock manager 128 determines whether a row-level lock is associated with the row of the first page, and can grant or waitlist the requested row-level lock based on a compatibility of any existing row-level locks and the requested row-level lock.

In step 410, the flag associated with the first page is updated to a second value. For example, responsive to determining that no page-level locks are associated with page 308A, storage engine 120 updates the value of the noRLQ flag (e.g., flag 138A in page table entry 302A in system 300B) associated with page 308A to a second value (e.g., TRUE, 1, etc.) to indicate the absence of any RLQ interested in page 308A and/or a row thereof.

In step 412, the data manipulation command is executed against the row of the first page. For example, storage engine 120 executes DML commands 142 to modify a row of page 308A. In embodiments where flowchart 400 does not pass through step 408, storage engine 120 executes DML commands 142 without acquiring locks (e.g., page-level and/or row-level locks) on page 308A and/or rows thereof. In embodiments, the modification of the row of page 308A by storage engine 120 includes marking the modified row of page 308A with a TID associated with the DML command 142. In embodiments, the exclusive latch acquired in step 410 is released after execution of the data manipulation command.

Figure 5:
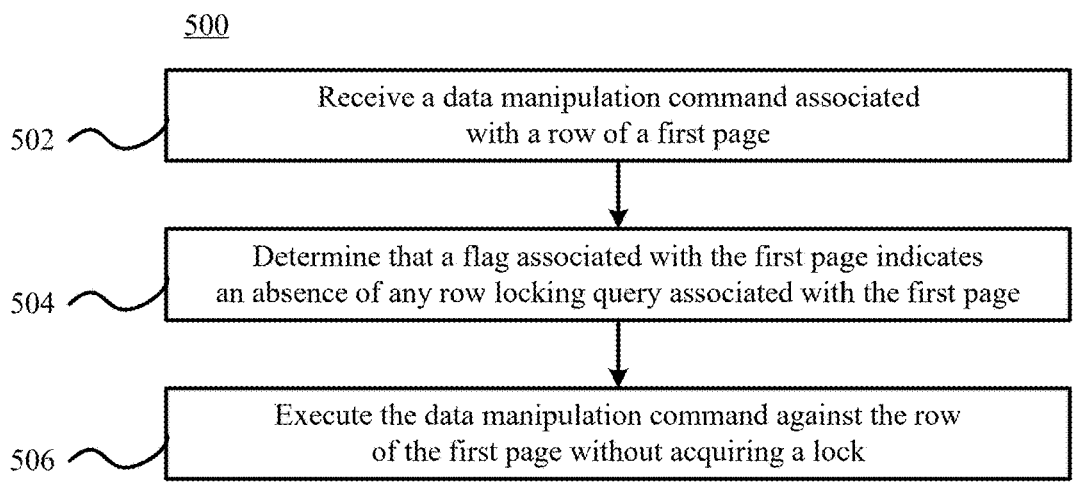
FIG. 5 depicts a flowchart of a process for performing a data manipulation command against a row without acquiring a lock on the row, in accordance with an embodiment.

Embodiments described herein may operate in various ways to perform a data manipulation command against a row without acquiring a lock on the row. FIG. 5 depicts a flowchart 500 of a process for performing a data manipulation command against a row without acquiring a lock on the row, in accordance with an embodiment. Database server 102, execution engine 110, storage engine 120, access manager 122, cache manager 124, transaction manager 126, lock manager 128, data cache 130, page table 132, buffer pool 134, page metadata 136, flag(s) 138, data file(s) 202, and/or latch manager 204 may, for example, operate according to flowchart 500. Note that, in some embodiments, the steps of flowchart 500 may be performed in different orders than shown. Flowchart 500 is described as follows with respect to FIGS. 1-3B for illustrative purposes.

Flowchart 500 starts at step 502. In step 502, a data manipulation command associated with a first row of a first page is received. For example, storage engine 120 receives, from execution engine 110, a DML command 142 to modify page 308B cached in buffer pool 134.

In step 504, it is determined that a flag associated with the first page indicates an absence of any row locking associated with the first page. For example, storage engine 120 tests a noRLQ flag (e.g., flag 138B in page table entry 302C of system 300A) and determines that the noRLQ flag associated with page 308B is equal to a second value (e.g., TRUE, 1, etc.) indicating the absence of any RLQ interested in page 308B and/or a row thereof. In embodiments, storage engine 120 interacts with latch manager 204 to acquire an exclusive latch on the in-memory container (e.g., page table entry 302C) storing the noRLQ flag associated with page 308B prior to testing the noRLQ flag associated with page 308B. In embodiments, the acquired exclusive latch is held until completion of step 506.

In step 506, the data manipulation command is executed against the row of the first page without acquiring a lock. For example, storage engine 120 executes DML commands 142 to modify a row of page 308B without acquiring locks (e.g., page-level and/or row-level locks) on page 308B and/or rows thereof. In embodiments, the modification of the row of page 308B by storage engine 120 includes marking the modified row of page 308B with a TID associated with the DML command 142. In embodiments, the exclusive latch acquired in step 504 is released after execution of the data manipulation command.

Figures 6, 7:
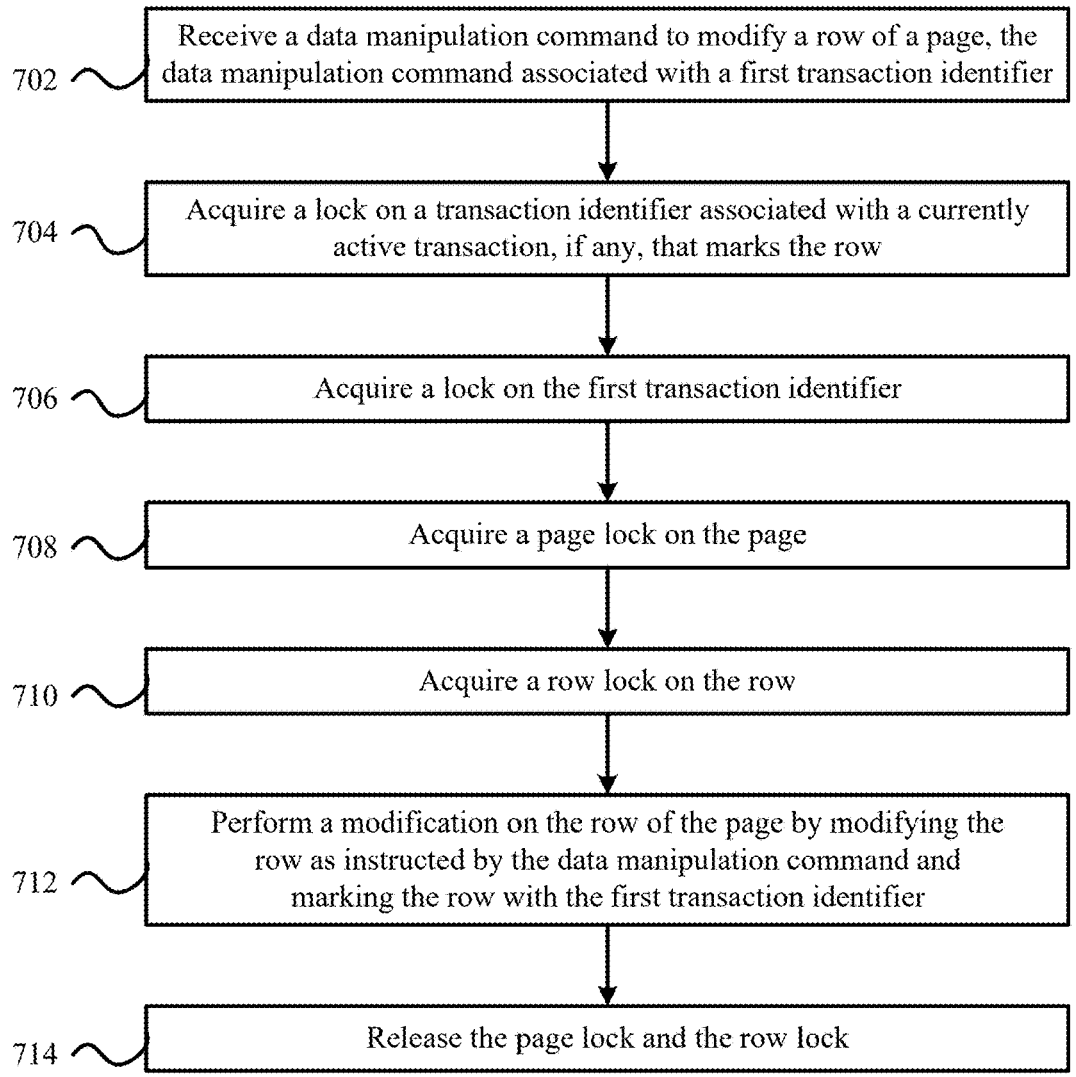
FIG. 6 depicts a flowchart of a process for initializing a flag for tracking row locking queries, in accordance with an embodiment.
FIG. 7 depicts a flowchart of a process for acquiring a transaction lock on a row, in accordance with an embodiment.

Embodiments described herein may operate in various ways to initialize a flag for tracking row locking queries. FIG. 6 depicts a flowchart 600 of a process for initializing a flag for tracking row locking queries, in accordance with an embodiment. Database server 102, execution engine 110, storage engine 120, access manager 122, cache manager 124, transaction manager 126, data cache 130, page table 132, buffer pool 134, page metadata 136, flag(s) 138, data file(s) 202, and/or latch manager 204 may, for example, operate according to flowchart 600. Note that not all steps of flowchart 600 may need to be performed in all embodiments, and in some embodiments, the steps of flowchart 600 may be performed in different orders than shown. Flowchart 600 is described as follows with respect to FIGS. 1-3B for illustrative purposes.

Flowchart 600 starts at step 602. In step 602, a first page is cached in an in-memory container. For example, cache manager 124 determines that page 308A is not present in buffer pool 134, and fetches page 308 from data file(s) 202 and caches page 308A in frame 304B of buffer pool 134. In embodiments, cache manager 124 determines whether page 308A is present in buffer pool 134 by determining whether a page identifier associated with page 308A and/or a hash of the page identifier associated with page 308A is present in page table 132.

In step 604, a flag associated with the first page is initialized in the in-memory container to a first value. For example, cache manager 124 initializes noRLQ flag (e.g., flag 138A in page table entry 302A of system 300A) to a first value (e.g., FALSE, 0, etc.) to indicate the possible presence of an RLQ interested in page 308A and/or a row thereof.

Embodiments described herein may operate in various ways to acquire a transaction lock on a row. FIG. 7 depicts a flowchart 700 of a process for acquiring a transaction lock on a row, in accordance with an embodiment. Database server 102, execution engine 110, storage engine 120, access manager 122, cache manager 124, transaction manager 126, lock manager 128, data cache 130, page table 132, buffer pool 134, page metadata 136, flag(s) 138, data file(s) 202, and/or latch manager 204 may, for example, operate according to flowchart 700. Note that not all steps of flowchart 700 may need to be performed in all embodiments, and in some embodiments, the steps of flowchart 700 may be performed in different orders than shown. Flowchart 700 is described as follows with respect to FIGS. 1-3B for illustrative purposes.

Flowchart 700 starts at step 702. In step 702, a data manipulation command to modify a row of a page is received, the data manipulation command associated with a first transaction identifier. For example, storage engine 120 receives, from execution engine 110, a DML command 142 to modify a row of page 308B cached in buffer pool 134. In embodiments, DML command 142 is part of a transaction associated with a first TID.

In step 704, a lock is acquired on a transaction identifier associated with a currently active transaction, if any, that marks the row. For example, access manager 122 determines whether the row of page 308B is marked with a TID associated with a currently active transaction, and, responsive to determining that the row of page 308B is marked with a TID associated with a currently active transaction, interacts with lock manager 128 to request a lock on the TID associated with the currently active transaction. In embodiments, lock manager 128 grants the requested lock when the currently active transaction is no longer active, thus ensuring that DML command 142 does not modify rows previously modified by a transaction that is currently active. In embodiments, access manager 122 releases the obtained lock immediately after obtaining it from lock manager 128.

In step 706, a lock is acquired on the first transaction identifier. For example, access manager 122 interacts with lock manager 128 to obtain a lock on the first TID associated with a transaction associated with DML command 142. In embodiments, access manager 122 may obtain the lock on the first TID associated with a transaction associated with DML command 142 only once during the lifetime of the transaction associated with DML command 142.

In step 708, a page lock is acquired on a page. For example, access manager 122 provides a lock request 152 to lock manager 128 to acquire a page-level lock on a page.

In step 710, a row lock is acquired on a row of the page. For example, access manager 122 provides a lock request 152 to lock manager 128 to acquire a row-level lock on a row of the locked page.

In step 712, a modification is made on the row of the page by modifying the row as instructed by a first data manipulation command and marking the row with a transaction identifier associated with the first data manipulation command. For example, storage engine 120 modifies the locked row as indicated by a DML command 142 and by marking the locked row with a transaction identifier associated with the DML command 142.

In step 714, the page lock and the row lock are released. For example, access manager 122 provides a lock request 152 to lock manager 128 to release the row-level lock on the locked row and the page-level lock on the locked page.

Figure 8:
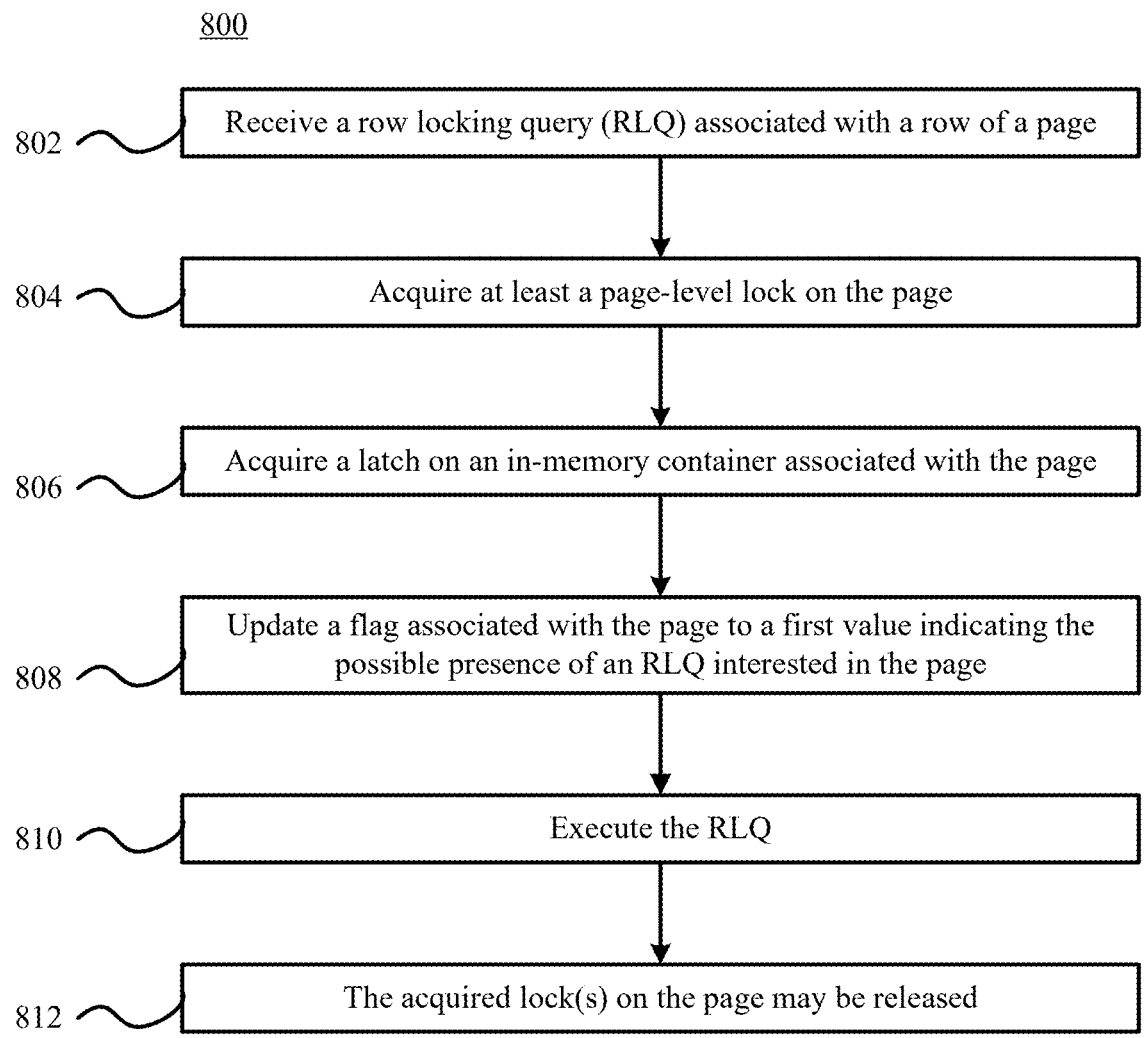
FIG. 8 depicts a flowchart of a process for updating a flag for tracking row locking queries, in accordance with an embodiment.

Embodiments described herein may operate in various ways to update a flag for tracking row locking queries. FIG. 8 depicts a flowchart 800 of a process for updating a flag for tracking row locking queries, in accordance with an embodiment. Database server 102, execution engine 110, storage engine 120, access manager 122, cache manager 124, transaction manager 126, lock manager 128, data cache 130, page table 132, buffer pool 134, page metadata 136, flag(s) 138, data file(s) 202, and/or latch manager 204 may, for example, operate according to flowchart 800. Note that not all steps of flowchart 800 may need to be performed in all embodiments, and in some embodiments, the steps of flowchart 800 may be performed in different orders than shown. Flowchart 800 is described as follows with respect to FIGS. 1-3B for illustrative purposes.

Flowchart 800 starts at step 802. In step 802, a row locking query (RLQ) associated with a row of a page is received. a data manipulation command associated with a first row of a first page is received. For example, storage engine 120 receives, from execution engine 110, an RLQ associated with page 308B cached in buffer pool 134. In embodiments, page 308B is cached in buffer pool 134 prior to arrival of the RLQ, or cached in buffer pool 134 responsive to the RLQ. Examples of RLQs include, but are not limited to, queries running at higher isolation levels like Repeatable Read and Serializable, and queries that use strong lock hints.

In step 804, at least a page-level lock is acquired on the page. For example, access manager 122 provides a lock request 152 to lock manager 128 to acquire a page-level lock on page 308B. In embodiments, additional locks (e.g., database-level, table-level, and/or row-level locks) are acquired by access manager 122 for execution of the RLQ.

In step 806, a latch is acquired on an in-memory container associated with the page. For example, storage engine 120 interacts with latch manager 204 to obtain at least one of a shared latch or an exclusive latch on page table entry 302C and/or frame 304A associated with page 308B.

In step 808, a flag associated with the page is updated to a first value to indicate the possible presence of an RLQ interested in the page. For example, storage engine 120 updates noRLQ flag (e.g., flag 136B in page table entry 302C in systems 300A and/or 300B) associated with page 308B to a first value (e.g., FALSE, 0, etc.) to indicate the possible presence of an RLQ interested in page 308B.

In step 810, the RLQ is executed. For example, storage engine 120 executes the RLQ.

In step 812, the acquired lock(s) on the page may be released based on the nature of the RLQ. For example, access manager 122 provides a lock request 152 to lock manager 128 to release the locks acquired on page 308B by the RLQ. In embodiments, the noRLQ flag (e.g., flag 136B in page table entry 302C in system 300A and/or 300B) associated with page 308B is not modified subsequent to execution of the RLQ and/or the release of the acquired lock(s) on page 308B.

Embodiments described herein may operate in various ways to update a flag for tracking row locking queries to a first value. FIG. 9A depicts a flowchart 900 of a process for updating a flag for tracking row locking queries to a first value, in accordance with an embodiment. Database server 102, execution engine 110, storage engine 120, access manager 122, cache manager 124, transaction manager 126, data cache 130, page table 132, buffer pool 134, page metadata 136, flag(s) 138, data file(s) 202, and/or latch manager 204 may, for example, operate according to flowchart 900. Flowchart 900 is described as follows with respect to FIGS. 1-3B for illustrative purposes.

Flowchart 900 starts at step 902. In step 902, at least one of a shared latch or an exclusive latch is acquired on an in-memory container associated with a first page. For example, storage engine 120 interacts with latch manager 204 to acquire at least one of a shared latch or an exclusive latch on page table entry 302C and/or frame 304A associated with page 308B.

In step 904, responsive to acquiring at least one of the shared latch or the exclusive latch, a flag in the in-memory container associated with the first page is updated to a first value indicating the possible presence of a row-locking query interested in the cached page. For example, storage engine 120 updates noRLQ flag (e.g., flag 138B of page table entry 302C in system 300A) to a first value (e.g., FALSE, 0, etc.) to indicate the possible presence of an RLQ interested in page 308B.

Embodiments described herein may operate in various ways to read a flag for tracking row locking queries. FIG. 9B depicts a flowchart 910 of a process for reading a flag for tracking row locking queries, in accordance with an embodiment. Database server 102, execution engine 110, storage engine 120, access manager 122, cache manager 124, transaction manager 126, data cache 130, page table 132, buffer pool 134, page metadata 136, flag(s) 138, data file(s) 202, and/or latch manager 204 may, for example, operate according to flowchart 910. Flowchart 910 is described as follows with respect to FIGS. 1-3B for illustrative purposes.

Flowchart 910 starts at step 912. In step 912, an exclusive latch is acquired on an in-memory container associated with a first page. For example, storage engine 120 interacts with latch manager 204 to acquire an exclusive latch on page table entry 302A and/or frame 304B associated with page 308A.

In step 914, responsive to acquiring the exclusive latch, a flag is read from the in-memory container associated with the first page. For example, storage engine 120 reads or tests noRLQ flag (e.g., flag 138A of page table entry 302A in systems 300A and/or 300B) to determine whether the noRLQ flag is equal to a first value (e.g., FALSE, 0, etc.) indicating the possible presence of an RLQ interested in page 308A or a second value (e.g., TRUE, 1, etc.) indicating the absence of any RLQ interested in page 308A.

Embodiments described herein may operate in various ways to update a flag for tracking row locking queries to a second value. FIG. 9C depicts a flowchart 920 of a process for updating a flag for tracking row locking queries to a second value, in accordance with an embodiment. Database server 102, execution engine 110, storage engine 120, access manager 122, cache manager 124, transaction manager 126, data cache 130, page table 132, buffer pool 134, page metadata 136, flag(s) 138, data file(s) 202, and/or latch manager 204 may, for example, operate according to flowchart 920. Flowchart 920 is described as follows with respect to FIGS. 1-3B for illustrative purposes.

Flowchart 920 starts at step 922. In step 922, an exclusive latch is acquired on an in-memory container associated with a first page. For example, storage engine 120 interacts with latch manager 204 to acquire an exclusive latch on page table entry 302A and/or frame 304B associated with page 308A.

In step 924, responsive to acquiring the exclusive latch, a flag in the in-memory container associated with the first page is updated to a second value indicating the absence of any row-locking query interested in the cached page. For example, storage engine 120 updates a noRLQ flag (e.g., flag 138A of page table entry 302A in system 300B) to a second value (e.g., TRUE, 1, etc.) to indicate the absence of any RLQ interested in page 308A.

III. Example Mobile Device and Computer System Implementation

Database server 102, execution engine 110, storage engine 120, access manager 122, cache manager 124, transaction manager 126, lock manager 128, data cache 130, page table 132, buffer pool 134, page metadata 136, flag(s) 138, data file(s) 202, latch manager 204, page table entries 302A-302N, frame(s) 304A-304N, page pointer(s) 306A-306B, page(s) 308A-308B, and/or components described therein, and/or the steps of flowcharts 400, 500, 600, 700, 800, 900, 910, and/or 920 are implemented in hardware, or hardware combined with one or both of software and/or firmware. For example, database server 102, execution engine 110, storage engine 120, access manager 122, cache manager 124, transaction manager 126, lock manager 128, data cache 130, page table 132, buffer pool 134, page metadata 136, flag(s) 138, data file(s) 202, latch manager 204, page table entries 302A-302N, frame(s) 304A-304N, page pointer(s) 306A-306B, page(s) 308A-308B, and/or components described therein, and/or the steps of flowcharts 400, 500, 600, 700, 800, 900, 910, and/or 920 are each implemented as computer program code/instructions configured to be executed in one or more processors and stored in a computer readable storage medium. Alternatively, database server 102, execution engine 110, storage engine 120, access manager 122, cache manager 124, transaction manager 126, lock manager 128, data cache 130, page table 132, buffer pool 134, page metadata 136, flag(s) 138, data file(s) 202, latch manager 204, page table entries 302A-302N, frame(s) 304A-304N, page pointer(s) 306A-306B, page(s) 308A-308B, and/or components described therein, and/or the steps of flowcharts 400, 500, 600, 700, 800, 900, 910, and/or 920 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 10:
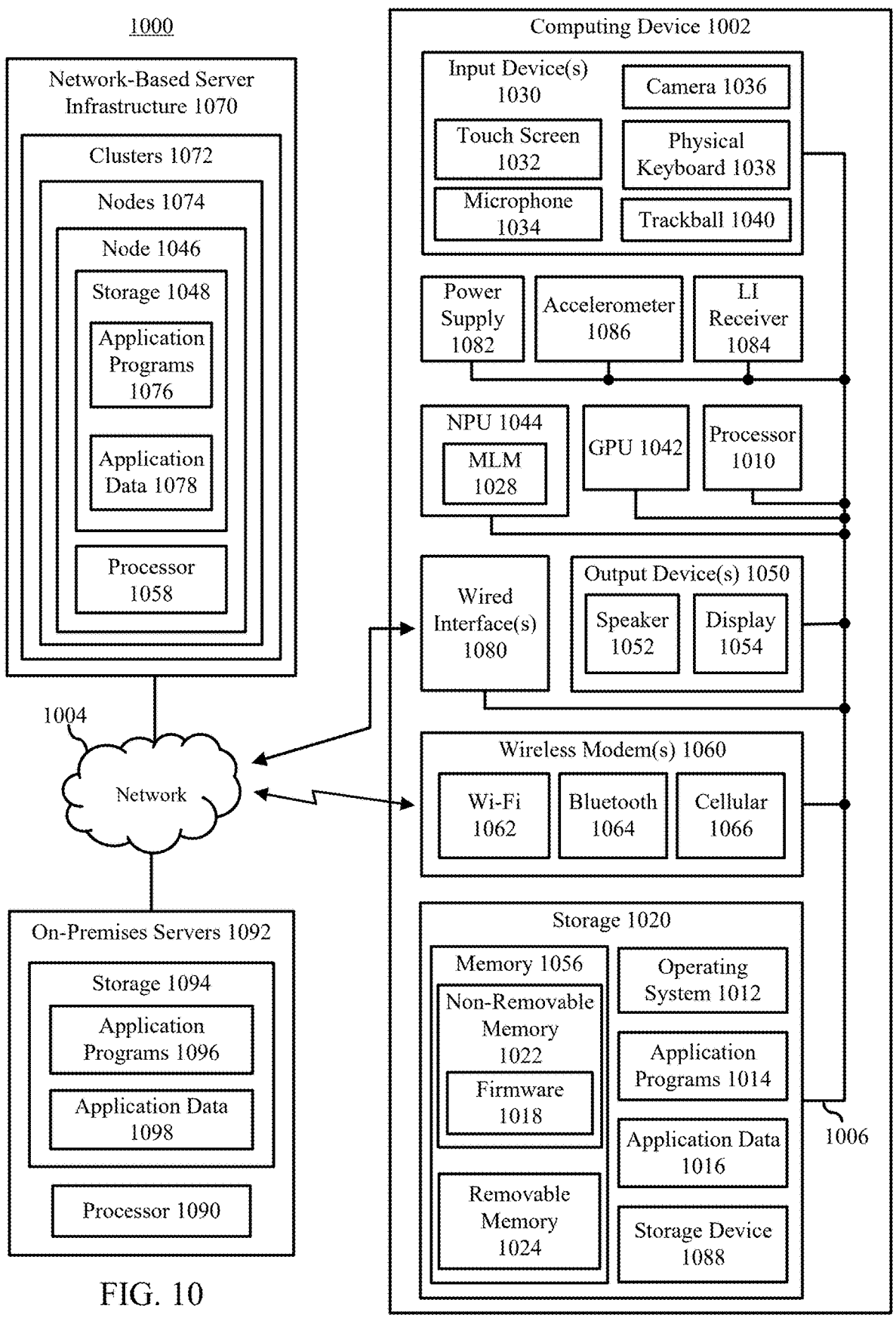
FIG. 10 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 10. FIG. 10 shows a block diagram of an exemplary computing environment 1000 that includes a computing device 1002. Computing device 1002 is an example of database server 102 and/or components thereof, which each include one or more of the components of computing device 1002. In some embodiments, computing device 1002 is communicatively coupled with devices (not shown in FIG. 10) external to computing environment 1000 via network 1004. Network 1004 comprises one or more networks such as local area networks (LANs), wide area networks (WANs), enterprise networks, the Internet, etc. In examples, network 1004 includes one or more wired and/or wireless portions. In some examples, network 1004 additionally or alternatively includes a cellular network for cellular communications. Computing device 1002 is described in detail as follows.

Computing device 1002 can be any of a variety of types of computing devices. Examples of computing device 1002 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1002 is a stationary computing device such as a desktop computer, a personal computer (PC), a stationary server device, a minicomputer, a mainframe, a supercomputer, etc.

As shown in FIG. 10, computing device 1002 includes a variety of hardware and software components, including a processor 1010, a storage 1020, a graphics processing unit (GPU) 1042, a neural processing unit (NPU) 1044, one or more input devices 1030, one or more output devices 1050, one or more wireless modems 1060, one or more wired interfaces 1080, a power supply 1082, a location information (LI) receiver 1084, and an accelerometer 1086. Storage 1020 includes memory 1056, which includes non-removable memory 1022 and removable memory 1024, and a storage device 1088. Storage 1020 also stores an operating system 1012, application programs 1014, and application data 1016. Wireless modem(s) 1060 include a Wi-Fi modem 1062, a Bluetooth modem 1064, and a cellular modem 1066. Output device(s) 1050 includes a speaker 1052 and a display 1054. Input device(s) 1030 includes a touch screen 1032, a microphone 1034, a camera 1036, a physical keyboard 1038, and a trackball 1040. Not all components of computing device 1002 shown in FIG. 10 are present in all embodiments, additional components not shown may be present, and in a particular embodiment any combination of the components are present. In examples, components of computing device 1002 are mounted to a circuit card (e.g., a motherboard) of computing device 1002, integrated in a housing of computing device 1002, or otherwise included in computing device 1002. The components of computing device 1002 are described as follows.

In embodiments, a single processor 1010 (e.g., central processing unit (CPU), microcontroller, a microprocessor, signal processor, ASIC (application specific integrated circuit), and/or other physical hardware processor circuit) or multiple processors 1010 are present in computing device 1002 for performing such tasks as program execution, signal coding, data processing, input/output processing, power control, and/or other functions. In examples, processor 1010 is a single-core or multi-core processor, and each processor core is single-threaded or multithreaded (to provide multiple threads of execution concurrently). Processor 1010 is configured to execute program code stored in a computer readable medium, such as program code of operating system 1012 and application programs 1014 stored in storage 1020. The program code is structured to cause processor 1010 to perform operations, including the processes/methods disclosed herein. Operating system 1012 controls the allocation and usage of the components of computing device 1002 and provides support for one or more application programs 1014 (also referred to as "applications" or "apps"). In examples, application programs 1014 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1010 includes one or more general processors (e.g., CPUs) configured with or coupled to one or more hardware accelerators, such as one or more NPUs 1044 and/or one or more GPUs 1042.

Any component in computing device 1002 can communicate with any other component according to function, although not all connections are shown for ease of illustration. For instance, as shown in FIG. 10, bus 1006 is a multiple signal line communication medium (e.g., conductive traces in silicon, metal traces along a motherboard, wires, etc.) present to communicatively couple processor 1010 to various other components of computing device 1002, although in other embodiments, an alternative bus, further buses, and/or one or more individual signal lines is/are present to communicatively couple components. Bus 1006 represents one or more of any of several types of bus structures, including a memory bus or memory controller, a peripheral bus, an accelerated graphics port, and a processor or local bus using any of a variety of bus architectures.

Storage 1020 is physical storage that includes one or both of memory 1056 and storage device 1088, which store operating system 1012, application programs 1014, and application data 1016 according to any distribution. Non-removable memory 1022 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1022 includes main memory and is separate from or fabricated in a same integrated circuit as processor 1010. As shown in FIG. 10, non-removable memory 1022 stores firmware 1018 that is present to provide low-level control of hardware. Examples of firmware 1018 include BIOS (Basic Input/Output System, such as on personal computers) and boot firmware (e.g., on smart phones). In examples, removable memory 1024 is inserted into a receptacle of or is otherwise coupled to computing device 1002 and can be removed by a user from computing device 1002. Removable memory 1024 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1088 are present that are internal and/or external to a housing of computing device 1002 and are or are not removable. Examples of storage device 1088 include a hard disk drive, a SSD, a thumb drive (e.g., a USB (Universal Serial Bus) flash drive), or other physical storage device.

One or more programs are stored in storage 1020. Such programs include operating system 1012, one or more application programs 1014, and other program modules and program data. Examples of such application programs include computer program logic (e.g., computer program code/instructions) for implementing Database server 102, execution engine 110, storage engine 120, access manager 122, cache manager 124, transaction manager 126, lock manager 128, data cache 130, page table 132, buffer pool 134, page metadata 136, flag(s) 138, data file(s) 202, latch manager 204, page table entries 302A-302N, frame(s) 304A-304N, page pointer(s) 306A-306B, page(s) 308A-308B, and/or components described therein, as well as any of flowcharts 400, 500, 600, 700, 800, 900, 910, and/or 920, and/or any individual steps thereof.

Storage 1020 also stores data used and/or generated by operating system 1012 and application programs 1014 as application data 1016. Examples of application data 1016 include web pages, text, images, tables, sound files, video data, and other data. In examples, application data 1016 is sent to and/or received from one or more network servers or other devices via one or more wired or wireless networks. Storage 1020 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1002 through one or more input devices 1030 and receives information from computing device 1002 through one or more output devices 1050. Input device(s) 1030 includes one or more of touch screen 1032, microphone 1034, camera 1036, physical keyboard 1038 and/or trackball 1040 and output device(s) 1050 includes one or more of speaker 1052 and display 1054. Each of input device(s) 1030 and output device(s) 1050 are integral to computing device 1002 (e.g., built into a housing of computing device 1002) or are external to computing device 1002 (e.g., communicatively coupled wired or wirelessly to computing device 1002 via wired interface(s) 1080 and/or wireless modem(s) 1060). Further input devices 1030 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1054 displays information, as well as operating as touch screen 1032 by receiving user commands and/or other information (e.g., by touch, finger gestures, virtual keyboard, etc.) as a user interface. Any number of each type of input device(s) 1030 and output device(s) 1050 are present, including multiple microphones 1034, multiple cameras 1036, multiple speakers 1052, and/or multiple displays 1054.

In embodiments where GPU 1042 is present, GPU 1042 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1042 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1044 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1028. In an example, NPU 1044 is configured for a data-driven parallel computing and is highly efficient at processing massive multimedia data such as videos and images and processing data for neural networks. NPU 1044 is configured for efficient handling of AI-related tasks, such as speech recognition, background blurring in video calls, photo or video editing processes like object detection, etc.

In embodiments disclosed herein that implement ML models, NPU 1044 can be utilized to execute such ML models, of which MLM 1028 is an example. For instance, where applicable, MLM 1028 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1044 is used to train MLM 1028. To train MLM 1028, training data is that includes input features (attributes) and their corresponding output labels/target values (e.g., for supervised learning) is collected. A training algorithm is a computational procedure that is used so that MLM 1028 learns from the training data. Parameters/weights are internal settings of MLM 1028 that are adjusted during training by the training algorithm to reduce a difference between predictions by MLM 1028 and actual outcomes (e.g., output labels). In some examples, MLM 1028 is set with initial values for the parameters/weights. A loss function measures a dissimilarity between predictions by MLM 1028 and the target values, and the parameters/weights of MLM 1028 are adjusted to minimize the loss function. The parameters/weights are iteratively adjusted by an optimization technique, such as gradient descent. In this manner, MLM 1028 is generated through training by NPU 1044 to be used to generate inferences based on received input feature sets for particular applications. MLM 1028 is generated as a computer program or other type of algorithm configured to generate an output (e.g., a classification, a prediction/inference) based on received input features, and is stored in the form of a file or other data structure.

In examples, such training of MLM 1028 by NPU 1044 is supervised or unsupervised. According to supervised learning, input objects (e.g., a vector of predictor variables) and a desired output value (e.g., a human-labeled supervisory signal) train MLM 1028. The training data is processed, building a function that maps new data on expected output values. Example algorithms usable by NPU 1044 to perform supervised training of MLM 1028 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1028 is an LLM, MLM 1028 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1028 is trained to learn patterns from unlabeled data. For instance, in embodiments where MLM 1028 implements unsupervised learning techniques, MLM 1028 identifies one or more classifications or clusters to which an input belongs. During a training phase of MLM 1028 according to unsupervised learning, MLM 1028 tries to mimic the provided training data and uses the error in its mimicked output to correct itself (i.e., correct weights and biases). In further examples, NPU 1044 perform unsupervised training of MLM 1028 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1044 need not necessarily be present in all ML model embodiments. In embodiments where ML models are present, any one or more of processor 1010, GPU 1042, and/or NPU 1044 can be present to train and/or execute MLM 1028.

One or more wireless modems 1060 can be coupled to antenna(s) (not shown) of computing device 1002 and can support two-way communications between processor 1010 and devices external to computing device 1002 through network 1004, as would be understood to persons skilled in the relevant art(s). Wireless modem 1060 is shown generically and can include a cellular modem 1066 for communicating with one or more cellular networks, such as a GSM network for data and voice communications within a single cellular network, between cellular networks, or between the mobile device and a public switched telephone network (PSTN). In examples, wireless modem 1060 also or alternatively includes other radio-based modem types, such as a Bluetooth modem 1064 (also referred to as a "Bluetooth device") and/or Wi-Fi modem 1062 (also referred to as an "wireless adaptor"). Wi-Fi modem 1062 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1002 can further include power supply 1082, LI receiver 1084, accelerometer 1086, and/or one or more wired interfaces 1080. Example wired interfaces 1080 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1080 of computing device 1002 provide for wired connections between computing device 1002 and network 1004, or between computing device 1002 and one or more devices/peripherals when such devices/peripherals are external to computing device 1002 (e.g., a pointing device, display 1054, speaker 1052, camera 1036, physical keyboard 1038, etc.). Power supply 1082 is configured to supply power to each of the components of computing device 1002 and receives power from a battery internal to computing device 1002, and/or from a power cord plugged into a power port of computing device 1002 (e.g., a USB port, an A/C power port). LI receiver 1084 is useable for location determination of computing device 1002 and in examples includes a satellite navigation receiver such as a Global Positioning System (GPS) receiver and/or includes other type of location determiner configured to determine location of computing device 1002 based on received information (e.g., using cell tower triangulation, etc.). Accelerometer 1086, when present, is configured to determine an orientation of computing device 1002.

Note that the illustrated components of computing device 1002 are not required or all-inclusive, and fewer or greater numbers of components can be present as would be recognized by one skilled in the art. In examples, computing device 1002 includes one or more of a gyroscope, barometer, proximity sensor, ambient light sensor, digital compass, etc. In an example, processor 1010 and memory 1056 are co-located in a same semiconductor device package, such as being included together in an integrated circuit chip, FPGA, or system-on-chip (SOC), optionally along with further components of computing device 1002.

In embodiments, computing device 1002 is configured to implement any of the above-described features of flowcharts herein. Computer program logic for performing any of the operations, steps, and/or functions described herein is stored in storage 1020 and executed by processor 1010.

In some embodiments, server infrastructure 1070 is present in computing environment 1000 and is communicatively coupled with computing device 1002 via network 1004. Server infrastructure 1070, when present, is a network-accessible server set (e.g., a cloud-based environment or platform). As shown in FIG. 10, server infrastructure 1070 includes clusters 1072. Each of clusters 1072 comprises a group of one or more compute nodes and/or a group of one or more storage nodes. For example, as shown in FIG. 10, cluster 1072 includes nodes 1074. Each of nodes 1074 are accessible via network 1004 (e.g., in a "cloud-based" embodiment) to build, deploy, and manage applications and services. In examples, any of nodes 1074 is a storage node that comprises a plurality of physical storage disks, SSDs, and/or other physical storage devices that are accessible via network 1004 and are configured to store data associated with the applications and services managed by nodes 1074.

Each of nodes 1074, as a compute node, comprises one or more server computers, server systems, and/or computing devices. For instance, a node 1074 in accordance with an embodiment includes one or more of the components of computing device 1002 disclosed herein. Each of nodes 1074 is configured to execute one or more software applications (or "applications") and/or services and/or manage hardware resources (e.g., processors, memory, etc.), which are utilized by users (e.g., customers) of the network-accessible server set. In examples, as shown in FIG. 10, nodes 1074 includes a node 1046 that includes storage 1048 and/or one or more of a processor 1058 (e.g., similar to processor 1010, GPU 1042, and/or NPU 1044 of computing device 1002). Storage 1048 stores application programs 1076 and application data 1078. Processor(s) 1058 operate application programs 1076 which access and/or generate related application data 1078. In an implementation, nodes such as node 1046 of nodes 1074 operate or comprise one or more virtual machines, with each virtual machine emulating a system architecture (e.g., an operating system), in an isolated manner, upon which applications such as application programs 1076 are executed.

In embodiments, one or more of clusters 1072 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1072 are included in a datacenter in a distributed collection of datacenters. In embodiments, exemplary computing environment 1000 comprises part of a cloud-based platform.

In an embodiment, computing device 1002 accesses application programs 1076 for execution in any manner, such as by a client application and/or a browser at computing device 1002.

In an example, for purposes of network (e.g., cloud) backup and data security, computing device 1002 additionally and/or alternatively synchronizes copies of application programs 1014 and/or application data 1016 to be stored at network-based server infrastructure 1070 as application programs 1076 and/or application data 1078. In examples, operating system 1012 and/or application programs 1014 include a file hosting service client configured to synchronize applications and/or data stored in storage 1020 at network-based server infrastructure 1070.

In some embodiments, on-premises servers 1092 are present in computing environment 1000 and are communicatively coupled with computing device 1002 via network 1004. On-premises servers 1092, when present, are hosted within an organization's infrastructure and, in many cases, physically onsite of a facility of that organization. On-premises servers 1092 are controlled, administered, and maintained by IT (Information Technology) personnel of the organization or an IT partner to the organization. Application data 1098 can be shared by on-premises servers 1092 between computing devices of the organization, including computing device 1002 (when part of an organization) through a local network of the organization, and/or through further networks accessible to the organization (including the Internet). Furthermore, in examples, on-premises servers 1092 serve applications such as application programs 1096 to the computing devices of the organization, including computing device 1002. Accordingly, in examples, on-premises servers 1092 include storage 1094 (which includes one or more physical storage devices such as storage disks and/or SSDs) for storage of application programs 1096 and application data 1098 and include a processor 1090 (e.g., similar to processor 1010, GPU 1042, and/or NPU 1044 of computing device 1002) for execution of application programs 1096. In some embodiments, multiple processors 1090 are present for execution of application programs 1096 and/or for other purposes. In further examples, computing device 1002 is configured to synchronize copies of application programs 1014 and/or application data 1016 for backup storage at on-premises servers 1092 as application programs 1096 and/or application data 1098.

Embodiments described herein may be implemented in one or more of computing device 1002, network-based server infrastructure 1070, and on-premises servers 1092. For example, in some embodiments, computing device 1002 is used to implement systems, clients, or devices, or components/subcomponents thereof, disclosed elsewhere herein. In other embodiments, a combination of computing device 1002, network-based server infrastructure 1070, and/or on-premises servers 1092 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 1020. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1014) are stored in storage 1020. Such computer programs can also be received via wired interface(s) 1060 and/or wireless modem(s) 1060 over network 1004. Such computer programs, when executed or loaded by an application, enable computing device 1002 to implement features of embodiments discussed herein. Accordingly, such computer programs represent controllers of the computing device 1002.

Embodiments are also directed to computer program products comprising computer code or instructions stored on any computer-readable medium or computer-readable storage medium. Such computer program products include the physical storage of storage 1020 as well as further physical storage types.

IV. Additional Example Embodiments

In embodiments, a method comprises: receiving a first data manipulation command associated with a first row of a first page; determining a value of a flag associated with the first page; responsive to determining that the value of the flag associated with the first page is a first value, determining whether there is an active lock associated with the first page; responsive to determining that there is no active lock associated with the first page, updating the flag associated with the first page to a second value; responsive to determining that there is an active lock associated with the first page, acquiring a lock on the first row of the first page; and executing the first data manipulation command against the first row of the first page.

In embodiments, the method further comprises: receiving a second data manipulation command associated with a second row of the first page; determining that the value of the flag associated with the first page is the second value; and executing the second data manipulation command against the second row of the first page without acquiring a lock on the second row of the first page.

In embodiments, the method further comprises: caching the first page in an in-memory container; and initializing, in the in-memory container, the flag associated with the first page to the first value.

In embodiments, the method further comprises: receiving a row locking query associated with a second row of the first page; updating the flag associated with the first page to the first value; acquiring a second lock on the second row of the first page; and executing the row locking query against the second row of the first page.

In embodiments, updating the flag associated with the first page to the first value comprises: acquiring at least one of a shared latch or an exclusive latch on an in-memory container associated with the first page; and updating, responsive to acquiring at least one of the shared latch or the exclusive latch, the flag in the in-memory container to the first value.

In embodiments, determining a value of a flag associated with the first page comprises: acquiring an exclusive latch on an in-memory container associated with the first page; and reading the flag from the in-memory container associated with the first page.

In embodiments, updating the flag associated with the first page to the second value comprises: acquiring an exclusive latch on an in-memory container associated with the first page; and updating, responsive to acquiring the exclusive latch, the flag in the in-memory container to the second value.

In embodiments, executing the first data manipulation command against the first row of the first page comprises: performing a modification on the first row by modifying the first row as instructed by the first data manipulation command and marking the first row with a transaction identifier associated with the first data manipulation command.

In embodiments, a system comprises: a processor; and a memory device encoded with program code structured to cause the processor to: receive a first data manipulation command associated with a first row of a first page; determine a value of a flag associated with the first page; responsive to determining that the value of the flag associated with the first page is a first value, determine whether there is an active lock associated with the first page; responsive to determining that there is no active lock associated with the first page, update the flag associated with the first page to a second value; responsive to determining that there is an active lock associated with the first page, acquire a lock on the first row of the first page; and execute the first data manipulation command against the first row of the first page.

In embodiments, the program code is structured to further cause the processor to: receive a second data manipulation command associated with a second row of the first page; determine that the value of the flag associated with the first page is the second value; and execute the second data manipulation command against the second row of the first page without acquiring a lock on the second row of the first page.

In embodiments, the program code is structured to further cause the processor to: cache the first page in an in-memory container; and initialize, in the in-memory container, the flag associated with the first page to the first value.

In embodiments, the program code is structured to further cause the processor to: receive a row locking query associated with a second row of the first page; update the flag associated with the first page to the first value; acquire a second lock on the second row of the first page; and execute the row locking query against the second row of the first page.

In embodiments, to update the flag associated with the first page to the first value, the program code is structured to further cause the processor to: acquire at least one of a shared latch or an exclusive latch on an in-memory container associated with the first page; and update, responsive to acquiring at least one of the shared latch or the exclusive latch, the flag in the in-memory container to the first value.

In embodiments, to determine a value of a flag associated with the first page, the program code is structured to further cause the processor to: acquire an exclusive latch on an in-memory container associated with the first page; and read the flag from the in-memory container associated with the first page.

In embodiments, to update the flag associated with the first page to the second value, the program code is structured to further cause the processor to: acquire an exclusive latch on an in-memory container associated with the first page; and update, responsive to acquiring the exclusive latch, the flag in the in-memory container to the second value.

In embodiments, to execute the first data manipulation command against the first row of the first page, the program code is structured to further cause the processor to: perform a modification on the first row by modifying the first row as instructed by the first data manipulation command and marking the first row with a transaction identifier associated with the first data manipulation command.

In embodiments, a computer-readable storage medium comprises executable instructions that, when executed by a processor, cause the processor to: receive a first data manipulation command associated with a first row of a first page; determine that a flag associated with the first page has a value indicating an absence of any row locking query (RLQ) associated with the first page; and responsive to determining that the flag associated with the first page indicates an absence of any RLQ associated with the first page, execute the first data manipulation command against the first row of the first page without acquiring a lock on the first row or on the first page.

In embodiments, the executable instructions, when executed by the processor, further cause the processor to: receive a second data manipulation command associated with a second row of the first page; determine that the flag associated with the first page has a value indicating a possible presence of an RLQ associated with the first page; determine whether there is an active lock associated with the first page; responsive to determining that there is no active lock associated with the first page, update the flag associated with the first page to indicate the absence of any RLQ associated with the first page; responsive to determining that there is an active lock associated with the first page, acquire a lock on the second row of the first page; and execute the second data manipulation command against the second row of the first page.

In embodiments, the executable instructions, when executed by the processor, further cause the processor to: cache the first page in an in-memory container; and initialize, in the in-memory container, the flag associated with the first page to the value indicating the possible presence of an RLQ associated with the first page.

In embodiments, the executable instructions, when executed by the processor, further cause the processor to: receive an RLQ associated with a second row of the first page; acquire a lock on the second row and/or the first page; update the flag associated with the first page to the value indicating the possible presence of an RLQ associated with the first page; and execute the row locking query against the second row of the first page.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
receiving a first data manipulation command associated with a first row of a first page;
determining a value of a flag associated with the first page;
responsive to determining that the value of the flag associated with the first page is a first value, determining whether there is an active lock associated with the first page;
responsive to determining that there is no active lock associated with the first page, updating the flag associated with the first page to a second value indicating an absence of any row locking query (RLQ) associated with the first page and executing the first data manipulation command against the first row of the first page without acquiring a lock on the first row or on the first page; and responsive to determining that there is an active lock associated with the first page, executing the first data manipulation command against the first row of the first page after acquiring a lock on the first row of the first page.

2. The method of claim 1, further comprising:
receiving a second data manipulation command associated with a second row of the first page;
determining that the value of the flag associated with the first page is the second value; and
executing the second data manipulation command against the second row of the first page without acquiring a lock on the second row of the first page.

3. The method of claim 1, further comprising:
caching the first page in an in-memory container; and
initializing, in the in-memory container, the flag associated with the first page to the first value.

4. The method of claim 1, further comprising:
receiving a row locking query associated with a second row of the first page;
updating the flag associated with the first page to the first value;
acquiring a second lock on the second row of the first page; and
executing the row locking query against the second row of the first page.

5. The method of claim 4, wherein said updating the flag associated with the first page to the first value comprises:
acquiring at least one of a shared latch or an exclusive latch on an in-memory container associated with the first page; and
updating, responsive to acquiring at least one of the shared latch or the exclusive latch, the flag in the in-memory container to the first value.

6. The method of claim 1, wherein said determining a value of a flag associated with the first page comprises:
acquiring an exclusive latch on an in-memory container associated with the first page; and
reading the flag from the in-memory container associated with the first page.

7. The method of claim 1, wherein said updating the flag associated with the first page to the second value comprises:
acquiring an exclusive latch on an in-memory container associated with the first page; and
updating, responsive to acquiring the exclusive latch, the flag in the in-memory container to the second value.

8. The method of claim 1, wherein said executing the first data manipulation command against the first row of the first page comprises:
performing a modification on the first row by modifying the first row as instructed by the first data manipulation command and marking the first row with a transaction identifier associated with the first data manipulation command.

9. A system comprising:
a processor; and
a memory device encoded with program code structured to cause the processor to:
receive a first data manipulation command associated with a first row of a first page;
determine a value of a flag associated with the first page;

responsive to determining that the value of the flag associated with the first page is a first value, determine whether there is an active lock associated with the first page;

responsive to determining that there is no active lock associated with the first page, update the flag associated with the first page to a second value indicating an absence of any row locking query (RLQ) associated with the first page and execute the first data manipulation command against the first row of the first page without acquiring a lock on the first row or on the first page; and responsive to determining that there is an active lock associated with the first page, execute the first data manipulation command against the first row of the first page after acquiring a lock on the first row of the first page.

10. The system of claim 9, wherein the program code is structured to further cause the processor to:
receive a second data manipulation command associated with a second row of the first page;
determine that the value of the flag associated with the first page is the second value; and
execute the second data manipulation command against the second row of the first page without acquiring a lock on the second row of the first page.

11. The system of claim 9, wherein the program code is structured to further cause the processor to:
cache the first page in an in-memory container; and
initialize, in the in-memory container, the flag associated with the first page to the first value.

12. The system of claim 9, wherein the program code is structured to further cause the processor to:
receive a row locking query associated with a second row of the first page;
update the flag associated with the first page to the first value;
acquire a second lock on the second row of the first page; and
execute the row locking query against the second row of the first page.

13. The system of claim 12, wherein, to update the flag associated with the first page to the first value, the program code is structured to cause the processor to:
acquire at least one of a shared latch or an exclusive latch on an in-memory container associated with the first page; and
update, responsive to acquiring at least one of the shared latch or the exclusive latch, the flag in the in-memory container to the first value.

14. The system of claim 9, wherein, to determine a value of a flag associated with the first page, the program code is structured to cause the processor to:
acquire an exclusive latch on an in-memory container associated with the first page; and
read the flag from the in-memory container associated with the first page.

15. The system of claim 9, wherein, to update the flag associated with the first page to the second value, the program code is structured to cause the processor to:
acquire an exclusive latch on an in-memory container associated with the first page; and
update, responsive to acquiring the exclusive latch, the flag in the in-memory container to the second value.

16. The system of claim 9, wherein, to execute the first data manipulation command against the first row of the first page, the program code is structured to cause the processor to:
perform a modification on the first row by modifying the first row as instructed by the first data manipulation command and marking the first row with a transaction identifier associated with the first data manipulation command.

17. A computer-readable storage medium comprising executable instructions that, when executed by a processor, cause the processor to:
receive a first data manipulation command associated with a first row of a first page;
determine that a flag associated with the first page has a value indicating an absence of any row locking query (RLQ) associated with the first page; and
responsive to determining that the flag associated with the first page indicates an absence of any RLQ associated with the first page, execute the first data manipulation command against the first row of the first page without acquiring a lock on the first row or on the first page.

18. The computer-readable storage medium of claim 17, wherein the executable instructions, when executed by the processor, further cause the processor to:
receive a second data manipulation command associated with a second row of the first page;
determine that the flag associated with the first page has a value indicating a possible presence of an RLQ associated with the first page;
determine whether there is an active lock associated with the first page;
responsive to determining that there is no active lock associated with the first page, update the flag associated with the first page to indicate the absence of any RLQ associated with the first page;
responsive to determining that there is an active lock associated with the first page, acquire a lock on the second row of the first page; and
execute the second data manipulation command against the second row of the first page.

19. The computer-readable storage medium of claim 17, wherein the executable instructions, when executed by the processor, further cause the processor to:
cache the first page in an in-memory container; and
initialize, in the in-memory container, the flag associated with the first page to the value indicating the possible presence of an RLQ associated with the first page.

20. The computer-readable storage medium of claim 17, wherein the executable instructions, when executed by the processor, further cause the processor to:
receive an RLQ associated with a second row of the first page;
acquire a lock on the second row and/or the first page;
update the flag associated with the first page to the value indicating the possible presence of an RLQ associated with the first page; and
execute the row locking query against the second row of the first page.

\* \* \* \* \*